United States Patent [19]

Menjo et al.

[11] Patent Number: 5,340,623
[45] Date of Patent: Aug. 23, 1994

[54] ORNAMENTAL PANEL FOR AUTOMOBILES

[75] Inventors: Yoshihiro Menjo; Fumio Nakagawa; Takuji Nagata; Hiroshi Kuriyama, all of Inazawa, Japan

[73] Assignee: Toyoda Gosei Co., Ltd., Nishikasugai, Japan

[21] Appl. No.: 727,522

[22] Filed: Jul. 9, 1991

[30] Foreign Application Priority Data

Jul. 13, 1990 [JP] Japan ................... 2-186864

[51] Int. Cl.⁵ .............................. B60R 13/00
[52] U.S. Cl. ...................... 428/31; 40/591; 293/1; 293/28; 428/174; 428/187; 428/189; 428/212; 428/219; 428/220
[58] Field of Search ............. 428/31, 30, 174, 187, 428/189, 212, 220, 219; 293/1, 28; 40/591

[56] References Cited

FOREIGN PATENT DOCUMENTS

| 8437081 | 12/1984 | Fed. Rep. of Germany . |
| 3446230 | 7/1985 | Fed. Rep. of Germany . |
| 275235 | 11/1982 | Japan . |
| 209637 | 12/1983 | Japan .................... 428/31 |
| 261748 | 12/1985 | Japan .................... 428/31 |
| 132445 | 6/1986 | Japan .................... 428/31 |
| 63-96952 | 6/1988 | Japan . |
| 1275235 | 11/1989 | Japan . |

Primary Examiner—Ellis P. Robinson
Assistant Examiner—Nasser Ahmad
Attorney, Agent, or Firm—Cushman, Darby & Cushman

[57] ABSTRACT

An ornamental panel for automobiles has a synthetic resin cover. An attaching base is molded separately from the cover and disposed opposite a rear surface of the cover. The cover is molded of a translucent material. The cover has its outer surface made smooth and its inner surface formed with a fine rugged pattern such as crimps. The base has a surface with a rugged pattern of a dimension larger than a dimension of the crimps of the cover. The pattern of the base may be hemispheric concave fisheyes which are two-dimensionally arranged side by side, for example. A metallic film is coated on the pattern of the base.

4 Claims, 7 Drawing Sheets

ORNAMENTAL PANEL FOR AUTOMOBILES

BACKGROUND OF THE INVENTION

1. Field of the Invention

This invention relates to an ornamental panel, particularly to an ornamental panel used in automobiles such as a Garnish fitted between rear combination lamps at a car rear end.

2. Description of the Related Art

Japanese Laid Open Patent Publication No. 1-275235, 275235, which has been laid open to public inspection on Nov. 2, 1989, discloses an ornamental panel for automobiles.

This ornamental panel has a rear surface of a transparent synthetic resin base divided into two or more areas. Adjacent areas thereof are applied with different colors of paint, that is colorless clear paint or colored clear paint, thereby forming base coat layers respectively. A metal reflecting layer is provided on surfaces of the base coat layers. A protective layer is coated on a surface of the metal reflective layer. Thus the ornamental panel shows a deep and profound interior as well as a variety of metallic appearances while using one synthetic resin.

However, the ornamental panel of the above publication can be easily be affected by dust or the like in manufacturing. In this case, the products will become defective. Namely, if dust or the like is stuck on the base or the base coat layer, both of which are transparent or colored-transparent, the dust thereon is conspicuous and spoils the appearance of the product. Moreover, it takes a considerable amount of time to recoat three layers: the base coat layer, the metal reflective layer and the protective layer. Thereby possibly adversely affecting the productivity. Furthermore, if there arises unevenness in painting each layer, then the tones of the product cannot be uniformly maintained with each other.

Specially, conventional ornamental panels for automobiles such as garnishes cannot be the same tone as that of rear combination lamps between which the panel is arranged. Namely, it is hard to match the colors thereof.

Japanese Laid Open Utility Model Publication No. 63-96952, which has been laid open to public inspection on Jun. 23, 1988, discloses another ornamental panel for automobiles.

The ornamental panel is fitted next to rear combination lamps. A finisher lens is attached integrally to a housing. The finisher lens is the same color and has the same cut as those of the lamps. The housing has a reflecting surface which has vertically extending notches and reflecting paint coated thereon.

However, in the above ornamental panel, the outer finisher lens has its inside surface formed with concavo-convex pattern of a dimension larger than that of the notches of the inner housing. Therefore, when the finisher lens is made of a synthetic resin, it is possible that shrinkage is brought forth on the outside surface of the finisher lens, thereby spoiling its appearance.

Still another ornamental panel for automobiles are shown in FIG. 7.

FIG. 5 shows a rear perspective view of an ornamental panel assembled to an automobile body. FIG. 6 illustrates a cross section of rear combination lamps of an automobile. FIG. 7 shows a cross section of a conventional ornamental panel for automobiles such as garnishes.

Rear combination lamps 31 are disposed at opposite corners of a rear end of an automobile 40. Generally, ornamental panels or garnishes 30 are arranged between the rear combination lamps 31, intending to look like additional rear combination lamps disposed next to the real rear combination lamps 31.

As shown in FIG. 6, common rear combination lamps 31 have a triplex structure: a cover lens 35 formed with a fisheye lens as an outermost cover, a Fresnel lens 32 disposed inside the cover lens 35 and a base 33 supporting a lamp 34 thereon. The apparent depth of the interior of a rear combination lamp 31 is determined by the number of lens. Thereby the ornamental panel, which is constructed as above, cannot present an appearance of interior depth similar to that of the lamps 31.

The ornamental panel shown in FIG. 7 has a triplex structure: a cover lens 41 formed with a fisheye lens, a Fresnel lens 42 disposed inside the cover lens 41 and a base 43. Further, a metallic film 44 is coated on an inside surface of the base 43. However, the ornamental panel needs the Fresnel lens 42 in order to make its appearance similar to the lamps 31. Therefore, it requires a lot of labor and time to manufacture the panel. Thus, there is a need for improvement in the productivity and manufacturing costs of ornamental panels.

SUMMARY OF THE INVENTION

In view of the above, it is an object of the invention to provide an ornamental panel for automobiles that presents an appearance of a deep interior of rear combination lamps while lowering its production cost.

In accordance with one preferred mode of the invention, there is provided an ornamental panel for automobiles that has a synthetic resin cover made of a translucent material. The synthetic resin cover has its outer surface made smooth and its inner surface formed with a fine rugged pattern. An attaching base is disposed opposite the inner surface of the synthetic resin cover. The attaching base is made separately from the synthetic resin cover. The attaching base has its inner surface formed with a rugged pattern of a dimension larger than a dimension of the pattern of the inner surface of the synthetic resin cover. A metallic film is provided on the rugged pattern of the attaching base.

Further objects and advantages of the invention will be apparent from the following description, reference being had to the accompanying drawings, wherein preferred embodiments of the invention are clearly shown.

DETAILED DESCRIPTION OF THE PREFERRED EMBODIMENTS

Figure 1:
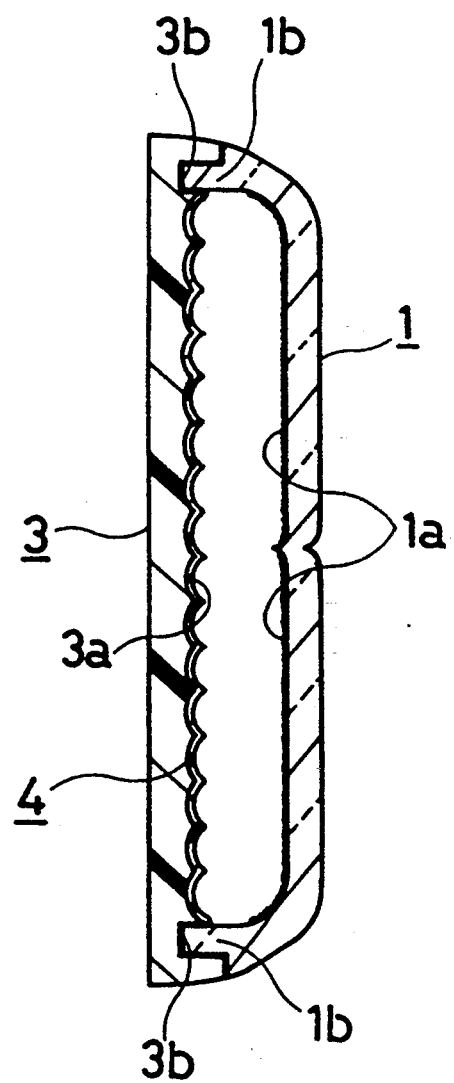
FIG. 1 is a schematic cross section showing a structure of a first embodiment of an ornamental panel for automobiles of the present invention.

Referring to the drawings, several preferred modes of the invention will be described hereafter.

Figure 5:
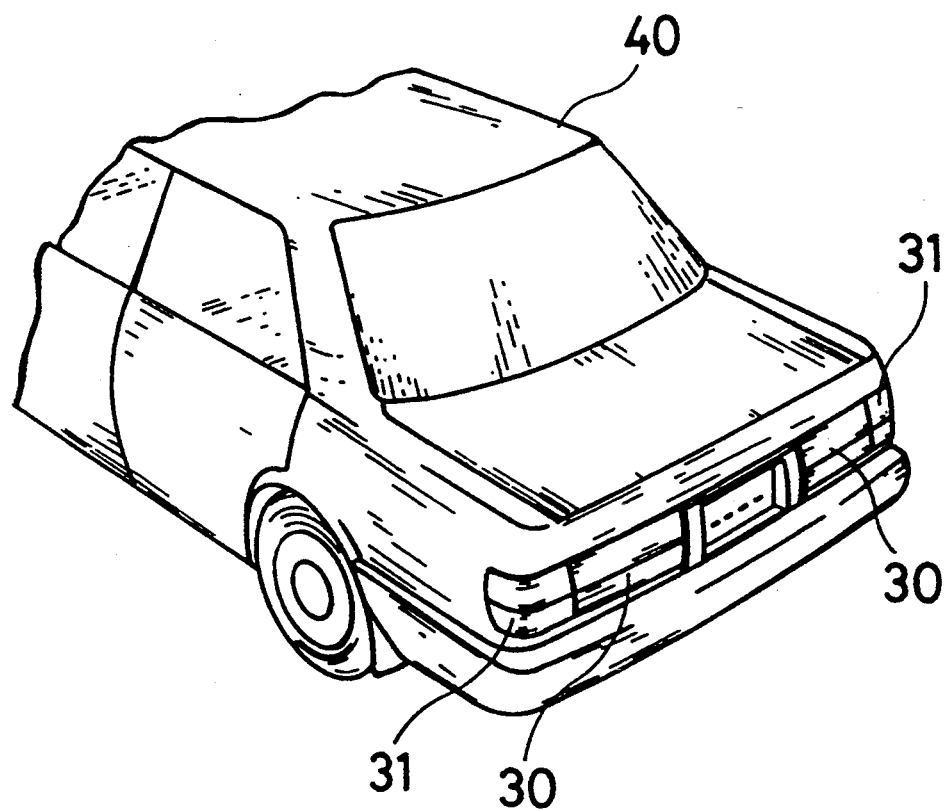
FIG. 5 is a rear perspective view of an ornamental panel for automobiles assembled to an automobile.
Figure 6:
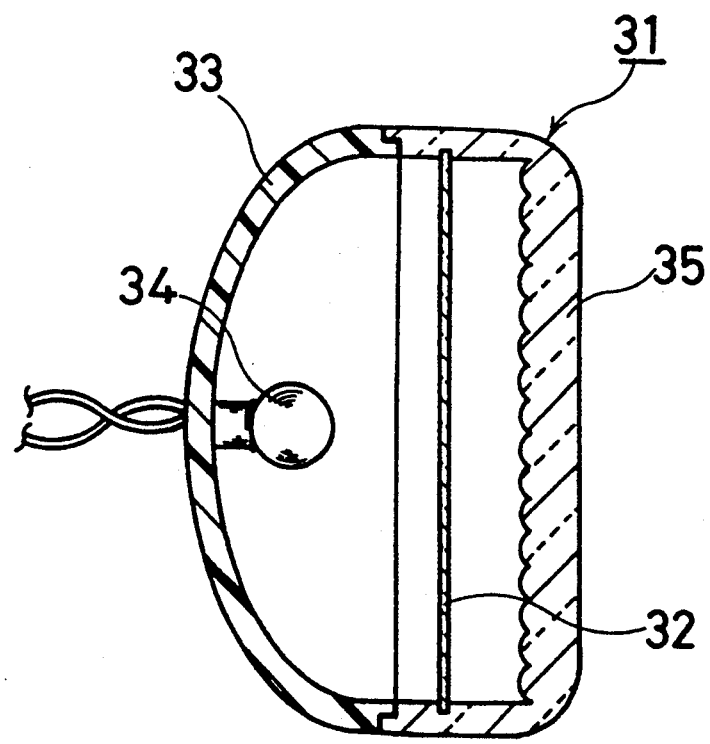
FIG. 6 is a cross section of rear combination lamps of an automobile.
Figure 7:
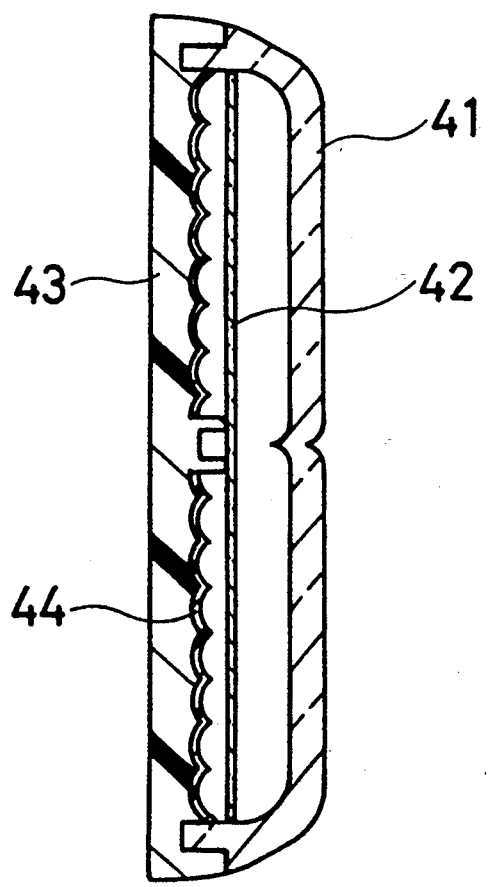
FIG. 7 is a cross section of a conventional ornamental panel for automobiles.

FIG. 1 illustrates a cross sectional view of a first embodiment of an ornamental panel for automobiles of the invention. FIG. 5 shows a rear perspective view of an automobile with an ornamental panel attached thereto.

Referring to FIG. 1, a synthetic resin cover 1 is molded of a material, e.g. acrylic resin, polycarbonate or the like, into a translucent amber in its entirety. The cover 1 and an attaching base 3 constitute a whole garnish which is arranged next to and between rear combination lamps. The cover 1 has its inner or rear surface formed with a fine rugged pattern. The pattern is shown as crimps 1a in the first embodiment. Laterally opposite ends of the cover 1 are formed into fitting ends 1b of such a shape as to be fittable to the base 3. The cover 1 is the same color as that of the rear combination lamps, thus being the same tone as that of the rear combination lamps.

The base 3 is molded separately from the cover 1. The base 3 has such a shape as to be attachable to a body of an automobile. The cover 1 and the base 3 are respectively made into such a structure that the fitting end 1b can be inserted and fitted into a fitting groove 3b that is formed around an outer periphery of the base 3. The cover 1 and the base 3 are made integral by a fixing means such as an adhesive, a clip or the like (not shown). The base 3 is disposed opposite the inside, or rear side of the cover 1. The base 3 has its inner surface formed with a rugged pattern 3a. The pattern 3a is made of hemispheric dents which are two-dimensionally arranged in succession. The hemispheric dents are shown as hemispheric concave fisheyes in the first embodiment. As obviously the drawings, the pattern 3a has a larger dimension than a dimension of the pattern 1a. A silver metallic paint is coated on the pattern 3a to form a metallic film 4.

When the first embodiment of the ornamental panel, constructed as above, is seen from the side of the cover 1, incident light from the outside goes through the cover 1 and is reflected on the metallic film 4 of the base 3 that is positioned at the rear side of the cover 1. Thus the translucent amber of the cover 1 appears to have the same tone as the amber of the rear combination lamps. Moreover, the transmitted light is irregularly refracted by the fine rugged pattern positioned at the inner surface of the cover 1, namely the crimps 1a. On the other hand, the film 4 of silver metallic paint functions as concave mirrors owing to the shape of the pattern 3a, so that the irregularly refracted light is reflected to become focused light. Thereby, the interior of the ornamental panel appears to be deeper than the actual depth between the cover 1 and the metallic film 4 on the base 3. Thus, the ornamental panel matches the appearance of the common rear combination lamps, which accommodate the Fresnel lens therein. As a result, the garnish and the rear combination lamp are a great choice in their design.

Moreover, the crimps 1a as a pattern, that serve to diffuse the light, are formed by very small dents or protrusions. Thus, there will be no fear that shrinkage is produced on the surface of the cover 1 when the cover is molded.

Furthermore, the base 3 has the metallic film 4 that functions as a Fresnel lens and is formed separately from the cover 1. Therefore, various apparent depths of the interior of the ornamental panel can be realized by changing the relative position of the cover I and the base 3, or the thickness or the refractive index of the cover 1. Thus the garnish described in the first embodiment has an improved appearance by perfectly matching the rear combination lamps.

In addition, the first embodiment of the ornamental panel is composed of the cover 1 and the base 3. In other words, it does not require a Fresnel lens. Thus the ornamental panel is easy to manufacture and the time for producing the ornamental panel can be shortened. Therefore, productivity is improved and the product can be made at lower cost.

Next, other embodiments of the present invention will be described. In each embodiment, only the differences from the first embodiment will be explained and the same reference numbers are attached to the features which are identical from the first embodiment. Thereby eliminating any redundant explanation.

Figure 2:
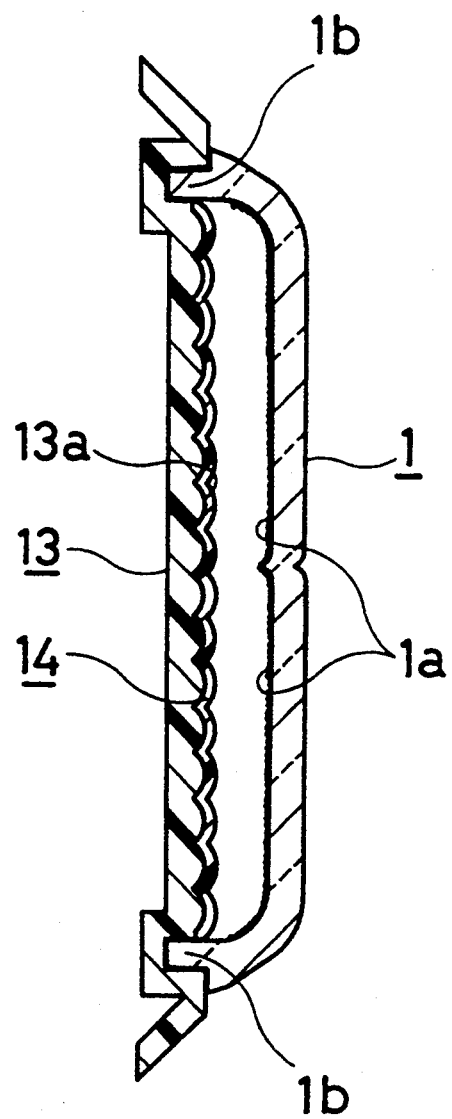
FIG. 2 is a schematic cross section showing a structure of a second embodiment of an ornamental panel for automobiles of the present invention.

FIG. 2 shows schematically a cross sectional of a second embodiment of an ornamental panel for automobiles of the present invention. The second embodiment of the ornamental panel is different from the first embodiment in structure of the pattern of the base and the metallic film.

Referring to FIG. 2, an attaching base 13 has its inner surface formed with a pattern 13a. The pattern 13a is composed of hemispheric protrusions or convex fisheyes which are two-dimensionally arranged side by side. A metallic paint is provided on a surface of the pattern 13a to form a metallic film 14. Of course, the pattern 13a has a dimension larger than that of the crimps 1a of the cover 1.

When the second embodiment of the ornamental panel is seen from the outside, as in the first embodiment, the incident light is reflected on the metallic film 14. Thus the translucent amber of the cover 1 appears to have the same tone as the amber of the rear combination lamps. Moreover, the crimps 1a irregularly refract and diffuse the transmitted light. The metallic film 14 functions as convex mirrors owing to the shape of the pattern 13a, and scatters the irregularly refracted light into diffused light. Thereby, the interior of the ornamental panel appears to be deeper than the actual depth between the cover 1 and the metallic film 14.

Moreover, the pattern 13a is defined by hemispheric convex fisheyes that are two-dimensionally arranged in succession on the base 13. Accordingly, the inner surface of a die, defining a cavity for making the base 13, can be of a shape composed of hemispherical dents two-dimensionally arranged in succession. In manufacturing the die, it is easier to provide the inner surface shape with hemispheric dents than hemispheric protrusions. Therefore, the second embodiment has the advantage that production of the die is easier than producing the die of the first embodiment.

Figure 3:
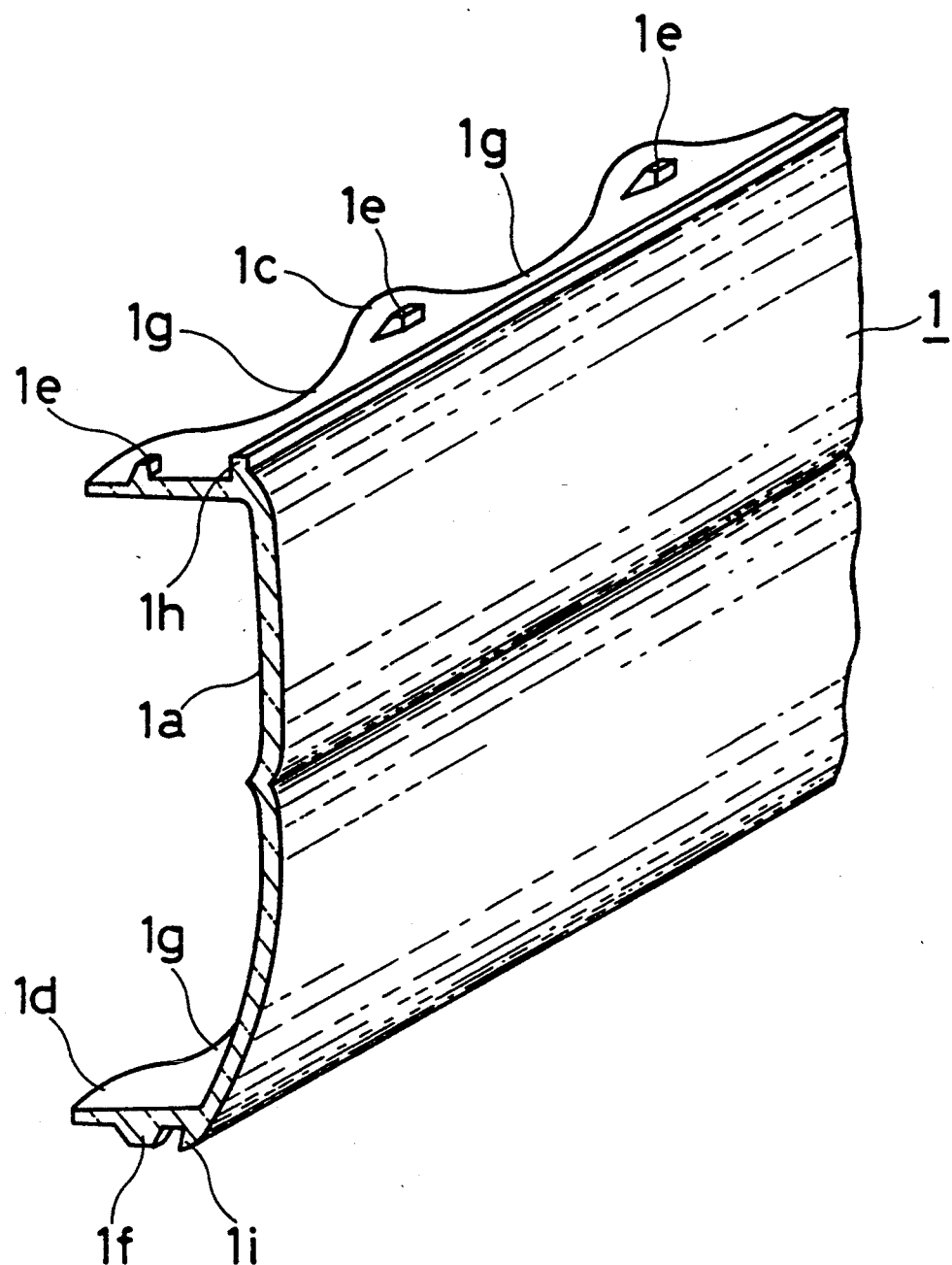
FIG. 3 is a perspective view showing a third embodiment of a synthetic resin cover of the present invention.
Figure 4:
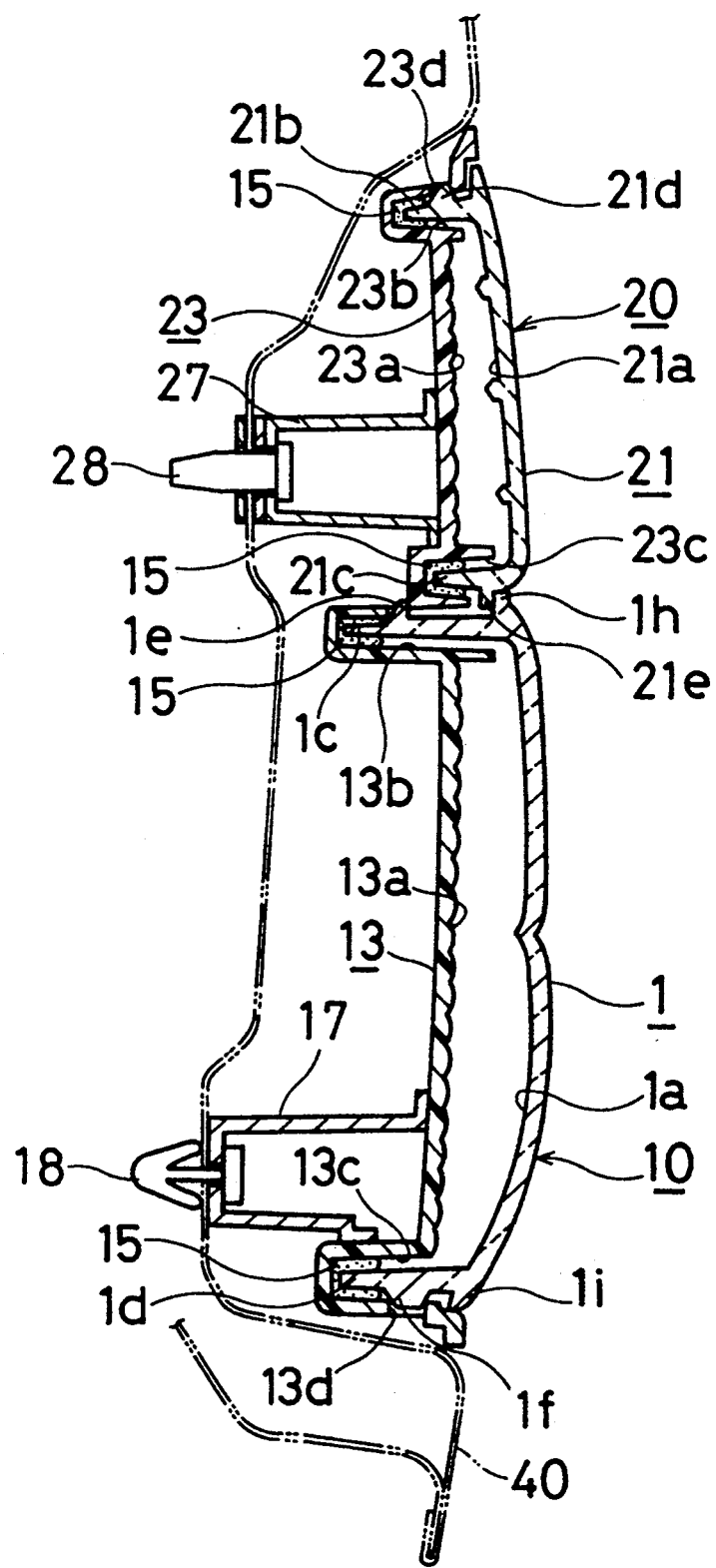
FIG. 4 is a cross section showing one preferred mode of an assembling structure of a third embodiment of an ornamental panel for automobiles to an automobile body.

FIG. 3 shows a perspective view of a third embodiment of an ornamental panel for automobiles. FIG. 4 shows a cross sectional view of the third embodiment ornamental panel assembled to a car body. The third embodiment discloses more specifically a way of joining of the cover 1 and the base 3, 13 of the first or second embodiment as well as their assembling structure to the car body.

Referring to FIG. 3, a pair of mounting flanges 1c and 1d are integrally formed along upper and lower edges of the cover 1. A plurality of stopper lugs 1e and 1f protrude from an upper surface of the flange 1c and lower surface of the flange 1d, respectively. The lugs 1c, 1d are aligned at constant intervals. The flanges 1c and 1d have a major part thereof cut off between the adjacent lugs 1e, 1f to define voids 1g. Elongate holding ribs 1h and 1i are integrally formed along the upper and lower edges of the cover 1, respectively. Since the major part of the flanges 1c and 1d are cut off between the lugs 1e and 1f, the cover 1 can be made of a lighter weight than a cover with flanges of constant width.

Referring to FIG. 4, an attaching base 13 is similar to the base-3 of the second embodiment. The base 13 has its upper and lower ends bent into a channel in secion so as to define fitting grooves 13b and 13c for accommodating the flanges 1c and 1d of the cover 1. The lower groove 13c has stopper holes 13d bored at positions corresponding to the lugs 1f. The stopper holes 13d receive and support the lugs if. Each of the lower lugs 1f is supported in the corresponding stopper hole 13d while each of the flanges 1c and 1d is accommodated and fixed by an adhesive in the corresponding groove 13b and 13c. Thus the cover 1 is made integral with the base 13. In this case, the lower rib 1f preferably touches with the base 13 in order to facilitate positioning or the like at the time of joining. Moreover, a base 3 of the first embodiment may alternately be joined with the cover 1 instead of the base 13.

Preferably, a small panel 20 is disposed on a top of a large panel 10. The panel 10 that is composed of the cover 1 and the base 13 joined integrally. The small panel 20 has a structure similar to that of the large panel 10. Namely, a small synthetic resin cover 21 has a structure similar to that of the cover 1. Crimps 21a are formed on a rear surface of the cover 21. A pair of mounting flanges 21b and 21c with voids (not shown) are formed along upper and lower edges of the cover 21. A plurality of stopper lugs 21d and 21e protrude at constant intervals from the flanges 21b and 21c, respectively.

On the other hand, a small attaching base 23 has a pattern 23a made up of a lot of hemispheric protrusions or convex fisheyes which are two-dimensionally arranged side by side. A metallic film (not shown) is formed on the pattern 23a. A pattern with hemispheric dents or concave fisheyes may be used instead of the convex fisheyes. The base 23 has fitting grooves 23b and 23c formed at its upper and lower ends to accommodate the flanges 21b and 21c. The upper groove 23b has stopper holes 23d bored at positions corresponding to the lugs 21d. Each of the upper lugs 21d is fitted into the corresponding stopper hole 23d while each of the flanges 21b and 21c is accommodated and fixed by an adhesive in the corresponding groove 23b and 23c. Thus the cover 21 is made integral with the base 23.

A plurality of supporting legs 17 are secured on a lower rear surface of the base 13 of the large panel 10 along its length. A clip 18 is fixed to each leg 17. A plurality of supporting legs 27 are secured on a lower rear surface of the base 23 of the large panel 20 along its length. A clip 28 is fixed to each leg 27. The lugs 21e of the cover 21 and the lower end of the base 23 are held tightly between the rib 1h and the lugs 1e of the cover 1 so that the large and small panels 10 and 20 are made integral. The panels 10 and 20 are attached to a body of an automobile 40 via the clips 18 and 28. Thus, a pair of panels 10 and 20 in one body constitute the ornamental panel for automobiles of the present invention. In this case, all the lugs 1e, as a group, function as a supporting rib for gripping and fixing the small panel 10 in cooperation with the supporting rib 1h.

The ornamental panel constructed as above is assembled to the automobile body by the clips 18 and 28 so to prevent movement or separation of the ornamental panel from the automobile body. In this case, the large panel 10 grips and secures the lower end of the small panel 20 to regulate its movement and separation. At this time, the large panel 10 has a large mechanical joining strength and hardly comes off or separates from the body. Therefore, under the influence of the large panel 10, the small panel 20, joined thereto, is more reliably prevented from separating or detaching from the automobile body than the case in which both of the panels 10 and 20 are independently attached to the car body.

Moreover, in joining the large panel 10 and the small panel 20 which are individually molded, the panels 10 and 20 can be formed into different colors from each other. The variation of tones can thereby be increased. For example, if the present invention is concretized in two-color ornamental panels, like garnishes fitted between rear combination lamps, then one panel can be amber while the other panel can be red. Thus, the garnish can easily be made to have the same and matching tone as the tone of the amber and the tone of the red of the lamps. Also, matching of the colors is thereby made easier in the present invention. Further, since a boundary or contact line between the panels 10 and 20 defines a parting line between both colors, the parting line also looks good. Of course, both the panels 10 and 20 may be made of the same color.

The present invention may be practiced or embodied in still other ways without departing from the spirit and essential character thereof- For instance, while the first and second embodiments show ornamental panels which present an original color, i.e. amber for the cover 1. The present invention may alternately be embodied into an ornamental panel which presents red as well as amber. Namely, the cover 1 can be formed of a translucent amber synthetic resin. A red clear film can be coated on part of the inner surface of the cover 1. Thus the part coated with the red clear film looks red such that the color combination of amber and red cannot be noticed. On the other hand, the part of the cover 1 without the red clear film presents amber. Accordingly, in the case of showing amber and red, a finish color can be determined by a base material color for the cover 1 and a color of a red clear paint for the coat. As a result, variations in the choice of design can be increased.

Moreover, while hemispheric concave or convex fisheyes are two-dimensionally arranged side by side on the surface of the base 3, 13, which is disposed at the rear side of the cover 1, in the above first and second embodiments, the invention may alternately be practiced by a plurality of elongated protrusions of arc cross-section extend in one direction, i.e. laterally or longitudinally of the panel. They can be arranged, in succession, two-dimensionally or cross-sectionally of the panel. Moreover, a plurality of elongate dents and protrusions may extend in one direction or two directions, i.e. laterally or longitudinally of the panel. They can be arranged, in succession, cross-sectionally of the panel. As mentioned above, it is better to provide the inner surface of the base with a predetermined shape of ups and downs so that the interior of the panel appears deeper than it actual is.

Further, while the third embodiment of the ornamental panel is made up of a pair of panels 10 and 20 which are integrally joined, an ornamental panel of the present invention may be constructed by a single ornamental panel.

The preferred embodiments described herein are therefore illustrative and not restrictive, the scope of the invention being indicated in the appended claims and all variations which come within the meaning of the claims are intended to be embraced therein.

What is claimed is:

1. An ornamental panel for automobiles comprising:
   a molded synthetic resin cover made of a translucent material and having an outer surface made smooth and an inner surface formed with a first rugged pattern;
   an attaching molded base coupled to said synthetic resin cover such that a surface of said base is disposed opposite to the inner surface of the synthetic resin cover said attaching base being attached so as to be spaced apart from said synthetic resin cover, said surface of the attaching base being formed with a second rugged pattern of a dimension larger than a dimension of the first rugged pattern of the inner surface of the synthetic resin cover, the second rugged pattern including a plurality of hemispheric convexes two-dimensionally arranged in succession; and
   a metallic film disposed on the pattern of said attaching base,
   the synthetic resin cover including a first cover portion and a second cover portion larger than the first cover portion,
   the attaching base including a first base portion fixed to the first cover portion and a second base portion larger than the first base portion fixed to the second cover portion,
   the first cover portion and the first base portion being fixedly supported on the second cover portion and the second base portion.

2. An ornamental panel for automobiles according to claim 1, wherein the second cover portion has a pair of supporting ribs holding therebetween a lateral edge of the first cover portion and the first base.

3. An ornamental panel for automobiles comprising:
   a molded synthetic resin cover made of a translucent material and having its outer surface made smooth and inner surface formed with a first rugged pattern;
   an attaching molded base coupled to said synthetic resin cover such that a surface of said base is disposed opposite to the inner surface of the synthetic resin cover, the attaching base being made separately from the synthetic resin cover said attaching base being attached so as to be spaced apart from said synthetic resin cover, said surface of the attaching base being formed with a second rugged pattern of a dimension larger than a dimension of the first rugged pattern of the inner surface of the synthetic resin cover, the second rugged pattern including a plurality of hemispheric dents two-dimensionally arranged in succession; and
   a metallic film disposed on the pattern of said attaching base,
   the synthetic resin cover including a first cover and a second cover larger than the first cover,
   the attaching base including a first base fixed to the first cover and a second base larger than the first base and fixed to the second cover,
   the first cover and the first base being fixedly supported on the second cover and the second base.

4. An ornamental panel for automobiles according to claim 3, wherein the second cover has a pair of supporting ribs holding therebetween a lateral edge of the first cover and the first base.

* * * * *